United States Patent
Norris et al.

(10) Patent No.: US 7,100,019 B2
(45) Date of Patent: Aug. 29, 2006

(54) METHOD AND APPARATUS FOR ADDRESSING A VECTOR OF ELEMENTS IN A PARTITIONED MEMORY USING STRIDE, SKIP AND SPAN VALUES

(75) Inventors: James M. Norris, Naperville, IL (US); Philip E. May, Palatine, IL (US); Kent D. Moat, Winfield, IL (US); Raymond B. Essick, IV, Glen Ellyn, IL (US); Brian G. Lucas, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 348 days.

(21) Appl. No.: 10/657,793

(22) Filed: Sep. 8, 2003

(65) Prior Publication Data

US 2004/0117595 A1    Jun. 17, 2004

Related U.S. Application Data

(63) Continuation-in-part of application No. 10/184,583, filed on Jun. 28, 2002.

(51) Int. Cl.
  *G06F 15/00* (2006.01)
  *G06F 12/00* (2006.01)
(52) U.S. Cl. .............................. 712/7; 712/6; 711/213; 711/217; 711/219; 711/220
(58) Field of Classification Search .................. 712/4, 712/6, 7; 711/213, 217–220
  See application file for complete search history.

(56) References Cited

U.S. PATENT DOCUMENTS

| | | |
|---|---|---|
| 3,718,912 A | 2/1973 | Hasbrouck et al. |
| 4,128,880 A | 12/1978 | Cray, Jr. |
| 4,744,043 A | 5/1988 | Kloker |
| 4,760,545 A | 7/1988 | Inagami et al. |
| 4,807,183 A | 2/1989 | Kung et al. |
| 4,825,361 A | 4/1989 | Omoda et al. |
| 4,918,600 A | 4/1990 | Harper, III et al. |
| 5,206,822 A | 4/1993 | Taylor |
| 5,317,734 A | 5/1994 | Gupta |
| 5,367,494 A | 11/1994 | Shebanow et al. |
| 5,390,352 A * | 2/1995 | Kinoshita ..................... 712/7 |
| 5,418,953 A | 5/1995 | Hunt et al. |
| 5,423,040 A | 6/1995 | Epstein et al. |
| 5,450,607 A | 9/1995 | Kowalczyk et al. |
| 5,459,807 A | 10/1995 | Tamada |
| 5,652,909 A | 7/1997 | Kodosky |

(Continued)

OTHER PUBLICATIONS

Wulf, William A. "Evaluation of the WM Architecture." Proceedings of the 19th Annual International Symposium on Computer Architecture: 1992, pp. 382-390, ACM 0-89791-509-7/92/0005/0382.

(Continued)

*Primary Examiner*—Hong Kim

(57) ABSTRACT

A system and method for calculating memory addresses in a partitioned memory in a processing system having a processing unit, input and output units, a program sequencer and an external interface. An address calculator includes a set of storage elements, such as registers, and an arithmetic unit for calculating a memory address of a vector element dependent upon values stored in the storage elements and the address of a previous vector element. The storage elements hold STRIDE, SKIP and SPAN values and optionally a TYPE value, relating to the spacing between elements in the same partition, the spacing between elements in the consecutive partitions, the number of elements in a partition and the size of a vector element, respectively.

25 Claims, 3 Drawing Sheets

U.S. PATENT DOCUMENTS

| | | | |
|---|---|---|---|
| 5,697,788 | A | 12/1997 | Ohta |
| 5,717,947 | A | 2/1998 | Gallup et al. |
| 5,719,998 | A | 2/1998 | Ku et al. |
| 5,734,863 | A | 3/1998 | Kodosky et al. |
| 5,742,821 | A | 4/1998 | Prasanna |
| 5,764,787 | A | 6/1998 | Nickerson |
| 5,790,877 | A | 8/1998 | Nishiyama et al. |
| 5,805,614 | A | 9/1998 | Norris |
| 5,821,934 | A | 10/1998 | Kodosky et al. |
| 5,826,080 | A | 10/1998 | Dworzecki |
| 5,881,257 | A | 3/1999 | Glass et al. |
| 5,881,263 | A | 3/1999 | York et al. |
| 5,887,183 | A | 3/1999 | Agarwal et al. |
| 5,893,143 | A | 4/1999 | Tanaka et al. |
| 5,936,953 | A | 8/1999 | Simmons |
| 5,966,528 | A | 10/1999 | Wilkinson et al. |
| 5,969,975 | A | 10/1999 | Glass et al. |
| 5,999,736 | A | 12/1999 | Gupta et al. |
| 6,052,766 | A | 4/2000 | Betker et al. |
| 6,064,819 | A | 5/2000 | Franssen et al. |
| 6,104,962 | A | 8/2000 | Sastry |
| 6,112,023 | A | 8/2000 | Dave et al. |
| 6,128,775 | A | 10/2000 | Chow et al. |
| 6,173,389 | B1 | 1/2001 | Pechanek et al. |
| 6,192,384 | B1 | 2/2001 | Dally et al. |
| 6,202,130 | B1 * | 3/2001 | Scales et al. ............... 711/137 |
| 6,253,372 | B1 | 6/2001 | Komatsu et al. |
| 6,370,560 | B1 | 4/2002 | Robertazzi et al. |
| 6,381,687 | B1 * | 4/2002 | Sandstrom et al. ......... 711/213 |
| 6,430,671 | B1 | 8/2002 | Smith |
| 6,437,804 | B1 | 8/2002 | Ibe et al. |
| 6,442,701 | B1 | 8/2002 | Hurd |
| 6,490,612 | B1 | 12/2002 | Jones et al. |
| 6,513,107 | B1 * | 1/2003 | Ansari ........................... 712/4 |
| 6,571,016 | B1 | 5/2003 | Mehrotra et al. |
| 6,588,009 | B1 | 7/2003 | Guffens et al. |
| 6,598,221 | B1 | 7/2003 | Pegatoquet et al. |
| 6,629,123 | B1 | 9/2003 | Hunt |
| 6,647,546 | B1 * | 11/2003 | Hinker et al. ............... 717/137 |
| 6,665,749 | B1 | 12/2003 | Ansari |
| 6,732,354 | B1 | 5/2004 | Ebeling et al. |
| 6,745,160 | B1 | 6/2004 | Ashar et al. |
| 6,792,445 | B1 | 9/2004 | Jones et al. |
| 6,795,908 | B1 * | 9/2004 | Lee et al. ...................... 712/4 |
| 6,898,691 | B1 | 5/2005 | Blomgren et al. |
| 7,000,232 | B1 | 2/2006 | Jones et al. |
| 7,010,788 | B1 | 3/2006 | Rehg et al. |
| 2002/0080795 | A1 | 6/2002 | Van Wageningen et al. |
| 2002/0112228 | A1 | 8/2002 | Granston et al. |
| 2002/0120923 | A1 | 8/2002 | Granston et al. |
| 2003/0128712 | A1 | 7/2003 | Moriwaki et al. |
| 2004/0003206 | A1 * | 1/2004 | May et al. .................. 712/218 |
| 2005/0053012 | A1 | 3/2005 | Moyer |
| 2005/0055534 | A1 | 3/2005 | Moyer |
| 2005/0055543 | A1 | 3/2005 | Moyer |

OTHER PUBLICATIONS

Talla, Deependra; "Architectural Techniques to Accelerate Multimedia Applications on General-Purpose Processors"; University of Texas Doctoral Disertation: Aug. 2001; pp. 94-125 (Chapters 6 and 7); University of Texas, Austin, Texas.

Talla, Deependra; "Bottlemecks in Multimedia Processing with SIMD Style Extensions and Architectural Enhancements"; IEEE Transactions of Computers; Aug. 2003; pp. 1015-1031; vol. 62, No. 8; IEEE.

Lam, M., Software Pipelining: An Effective Scheduling Technique for VLIW Machines, Proceedings of the SIGPLAN '88 Conference on Programming Language Design and Implementation, Atlanta, Georgia, Jun. 22-24, 1988, pp. 318-328.

Lee, T. et al., A Transformation-Based Method for Loop Folding, IEEE Transactions on Computer-Aided Design of Integrated Circuits and Systems, vol. 13, No. 4, Apr. 1994, pp. 439-450.

Kavi, K.M. et al., A Formal Definition of Data Flow Graph Models, IEEE Transactions on Computers, vol. C-35, No. 11, Nov. 1986, pp. 940-948.

Cooper, K.D. et al., Efficient Computation of Flow Insensitive Interprocedural Summary Information, SIGPLAN Notices, vol. 19, No. 6, Jun. 1984, pp. 247-258.

Strong, H.R., Vector Execution of Flow Graphs, Journal of the Association of Computing Machinery, vol. 39, No. 1, Jan. 1983, pp. 186-196.

Aiken, A. et al., Resource-Constrained Software Pipelining, IEEE Transactions on Parallel and Distributed Systems, vol. 6, No. 12, Dec. 1995, pp. 1248-1270.

* cited by examiner

METHOD AND APPARATUS FOR ADDRESSING A VECTOR OF ELEMENTS IN A PARTITIONED MEMORY USING STRIDE, SKIP AND SPAN VALUES

PRIORITY CLAIM

This application is a continuation-in-part application that claims priority under 35 U.S.C. 120 to co-pending U.S. patent application Ser. No. 10/184,583 titled "Reconfigurable Streaming Vector Processor", filed Jun. 28, 2002, Art Unit 2183, Examiner Charles A. Harkness, pending and allowed, which is herein incorporated by reference.

CROSS REFERENCE TO RELATED APPLICATIONS

This application is related to patent application titled "Data Processing System Using Multiple Addressing Modes for SIMD Operations and Method Thereof," U.S. patent application Ser. No. 10/657,797, pending, filed on the same date as this application, which is assigned to the current assignee hereof.

FIELD OF THE INVENTION

This invention relates generally to the field of vector processing. More particularly, this invention relates to a method and apparatus for accessing partitioned memory for vector processing.

BACKGROUND OF THE INVENTION

Many new applications being planned for mobile devices (multimedia, graphics, image compression/decompression, etc.) involve a high percentage of vector computations. One limitation on the computation rate of these applications is the speed of accessing vector or matrix data stored in memory.

One approach to accessing vector data is to specify the starting address in memory of the data, the size of each data element (in bits) and the separation between consecutive data elements (the "stride"). This approach allows sequential data to be accessed, but cannot be used where the elements are not separated by a constant amount. So, for example, the approach cannot be used if parts of a data vector are stored in different memory partitions. For example, a two-dimensional image may be stored in consecutive memory locations, one row at a time. The memory addresses of a data vector representing a sub-block are not separated by an equal amount.

A further approach, which has application to the processing of sparse data matrices, is to generate vectors specifying the locations of the non-zero matrix elements in memory. While this method provides the flexibility required for specialized Finite Element calculations, it is more complex than required for most multimedia applications on portable devices.

A still further approach uses L1 and L2 memory caches to speed memory access. The data is pre-fetched in blocks defining the starting address, block size, block count, stride and stride modifier. The stride modifier allows diagonal elements of a data matrix to be accessed. However, the approach cannot be used unless the data elements are separated by a constant amount. Further, the approach does not allow for data access to start part way through a block without modifying the block structure.

SUMMARY

The present invention relates generally to a method and apparatus for accessing a set of vector elements in a partitioned memory. Objects and features of the invention will become apparent to those of ordinary skill in the art upon consideration of the following detailed description of the invention.

In accordance with one aspect of the invention, an address calculator is provided for calculating memory addresses in a partitioned memory in a processing system having a processing unit, input and output units, a program sequencer and an external interface. The address calculator includes a set of storage elements and an arithmetic unit for calculating a memory address of a vector element dependent upon the values stored in the storage elements and the address of a previous vector element. The storage elements store STRIDE, SKIP and SPAN values and, optionally, a TYPE value, relating to the spacing between elements in the same partition, the spacing between elements in the consecutive partitions, the number of elements in a partition and the size of a vector element, respectively. In accordance with an embodiment of a method of the invention, an element address, a first counter indicative of the number of elements of the vector elements in the first memory and a second counter indicative of the number of elements in the vector elements are initialized. Then, while the second counter indicates that not all of the vector elements have been accessed, the memory is accessed at the element address and the second counter is stepped. If the first counter indicates that at least one vector element remains in the partition, the element address is incremented by an amount related to the STRIDE or the product of the TYPE and STRIDE values and the first counter is stepped. Otherwise, the element address in incremented by an amount related to the SKIP or the product of the TYPE and SKIP values and the first counter is reset dependent upon the SPAN value, which indicates the number of elements of the vector elements in a partition.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

Figure 1:
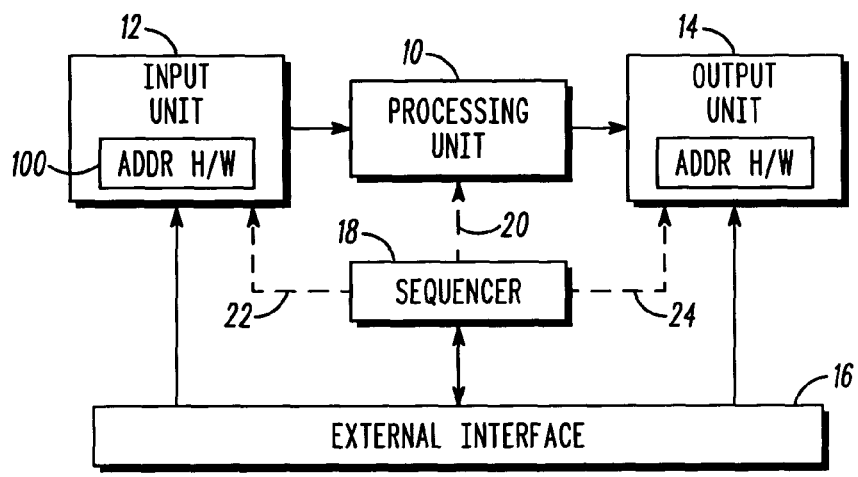
FIG. 1 is a representation of a processing system in accordance with an embodiment of the present invention.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

Vector processing may be performed by general-purpose processor or specialized processor. An example is the Reconfigurable Streaming Vector Processor (RVSP) described in the co-pending patent application Ser. No. 10/184,583 titled "Reconfigurable Streaming Vector Processor", filed Jun. 28, 2002, which is hereby incorporated herein by reference.

An exemplary processing unit incorporating an addressing system of the present invention is shown in FIG. 1. Referring to FIG. 1, the system includes a processing unit 10, which may comprise a number of functional elements and storage for intermediate results, an input unit 12 and an output unit 14. The input and output units incorporate addressing hardware or arithmetic unit 100 that will be described in more detail below with reference to FIG. 2. The function of the input unit 12 is to retrieve data elements via an external interface 16 (e.g. a system bus) and pass them to the processing unit 10. The function of the output unit 14 is to receive data elements from the processing unit 10 and pass them to the external interface 16. The system also includes a program sequencer 18 that controls the operation of the processing unit via link 20. The program sequencer 18 also controls the input and output units via links 22 and 24 respectively. The program sequencer executes a program of instructions that may be stored locally in a memory. The program of instructions may be received via the external interface 16, or via a separate interface. In the latter case, the processing system may have both a memory interface and a host interface.

An important element of a processor is its ability to access a vector of data elements stored in memory. Memory access is simplified when data elements are stored sequentially in memory. The data may be interleaved, in which case consecutive elements are not contiguous but are separated by an amount called a STRIDE. The STRIDE may be measured in a variety of different units, such as the number of elements between elements to be accessed, the number of words, the number of bytes or the number of bits. The STRIDE may be a fractional number to enable to access of subwords, for example. When large data structures are involved, data may be stored in different memory partitions. Also, when two- or three-dimensional data structures are stored in a linear memory, each row or column of the structure may be considered to be stored in a separate partition. Consecutive elements stored in different partitions may be separated by an amount that is different from the stride. This amount will be referred to as the "skip". Prior techniques do not use a "skip" value and so cannot be used where the elements are not separated by a constant amount, as when parts of a data vector are stored in different memory partitions. Prior techniques require the issuance of one or more additional instructions to access multiple memory partitions. This results in reduced performance and more complicated programming.

When accessing a sub-array from 2-dimensional array, the skip value may be used to move an address pointer to a new row or column of the array. When accessing a sub-array from 3-dimensional array, a second skip value may be used to move an address pointer to a new level of the array.

Figure 2:
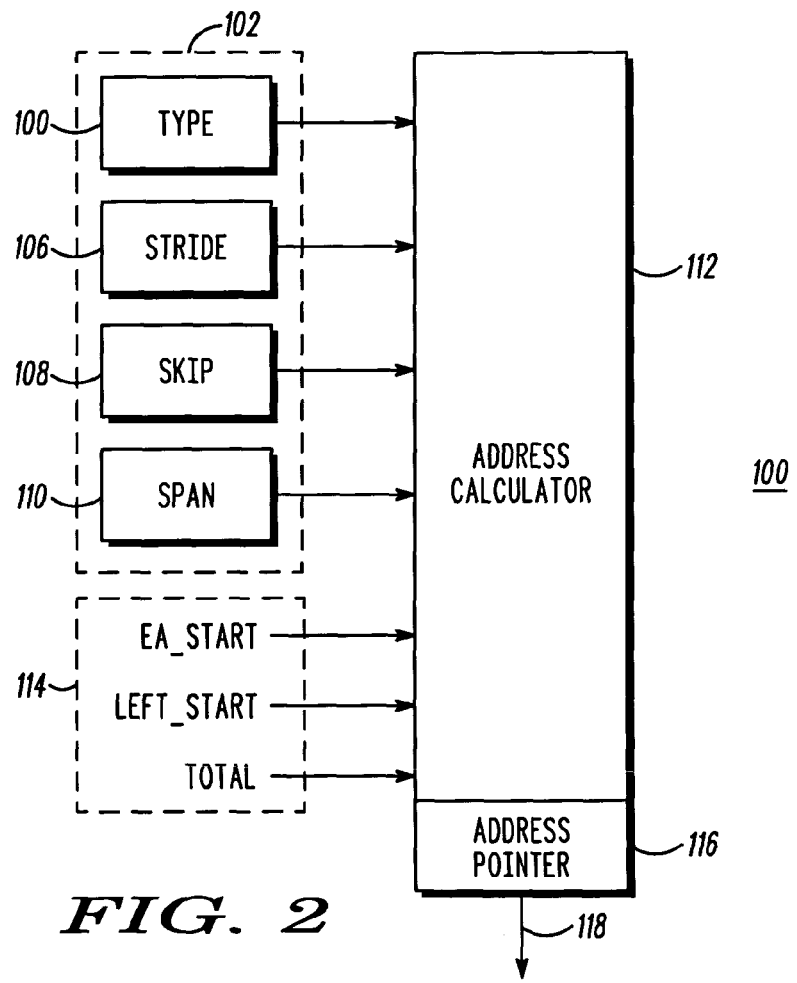
FIG. 2 is a representation of an addressing system in accordance with an embodiment of the present invention.

An exemplary embodiment of the address calculator 100 of present invention is shown in FIG. 2. Referring to FIG. 2, the address calculator 100 comprises a set of storage elements 102. The storage elements will be referred to as registers in the sequel, but may be other types of memory circuits or devices. The storage elements 102 include a TYPE register 104, a STRIDE register 106, a SKIP register 108 and a SPAN register 110. The registers are accessed by an arithmetic unit 112. The arithmetic unit may, for example, comprise a state machine and adder. The arithmetic unit 112 is initialized by a set of initialization values 114 that include the start address, denoted by EA_START, of a vector of data to be accessed, the initial value, denoted by LEFT_START, of a counter that indicates the number of data elements remaining in the first partition, and the total number of data elements, denoted by TOTAL, to be accessed in the memory. Once initialized, the arithmetic unit 112 is operable to calculate the address of a current data element in memory from the address of the previous element. The current address is stored in address pointer 116 and may be output at 118 to access the memory. The address calculator 100 may be used in concert with a pre-fetch architecture, such as a cache, so as to mitigate the adverse effects of slower memory. In this way, a processor may access data in almost every clock cycle, and be used with cheaper (slower) memory in cost sensitive applications.

The register values TYPE, STRIDE, SKIP and SPAN may be controlled by instructions sent from a program sequencer. The initial values EA_START, LEFT_START and TOTAL may be set in a similar fashion. If any of the values TYPE, STRIDE, SKIP, SPAN or LEFT_START is not specified, default values may be used. For example, the default values may assume that the data is stored in memory in a single partition of contiguous data.

Figure 3:
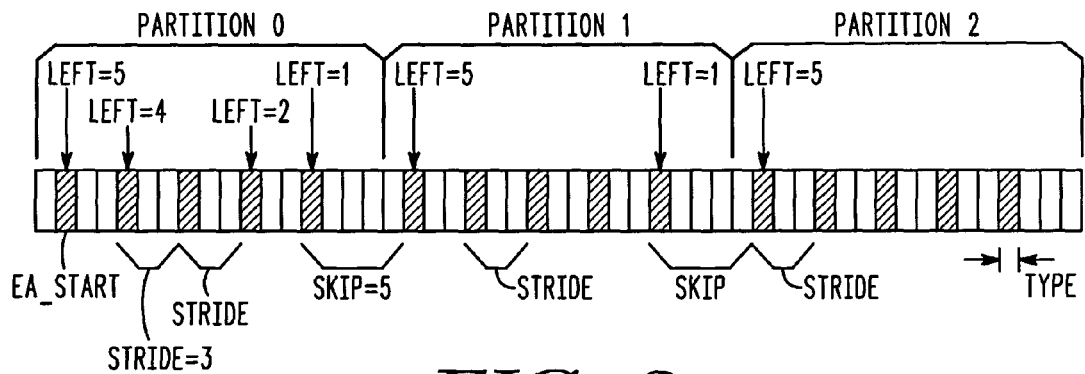
FIG. 3 is a representation of a partitioned memory in accordance with an embodiment of the present invention.

A diagrammatic representation of an exemplary partitioned memory is shown in FIG. 3. In this simplified example, the memory has three partitions (PARTITION 0, PARTITION 1 and PARTITION 2). The data vector to be accessed is interleaved so that, within each partition, every third memory element is an element of the vector. The address of the first data element is indicated as EA_START. Five data elements are stored in each memory partition, so the LEFT counter is initialized to 5. The total number of elements to be accessed is TOTAL=15, so a second counter is initialized with the value 15 and is decremented as each vector element is accessed. After the first element is accessed, the LEFT counter is decremented to 4, indicating that only 4 values remain in the current partition, and the TOTAL counter is decremented to 14. It will be apparent to those skilled in the art that vector elements may be counted by incrementing or decrementing counters. The address of the next element is calculated by adding the product of the STRIDE value and the TYPE value to the address of the current element. In this example, STRIDE=3, since every third element is to be accessed. TYPE denotes the length (in bits for example) of each data value. The process continues until the last element of the partition is accessed. The LEFT value is than decremented from 1 to 0. When the LEFT value goes to zero, the next memory address is calculated by adding the product of the SKIP value and the TYPE value to the current address. In this example, SKIP=5. The address then points to the first value in PARTITION 1. The LEFT value is reset to 5, to indicate that 5 values remain in PARTITION 1. This process continues until all vector elements (15 in this example) have been accessed.

Figure 4:
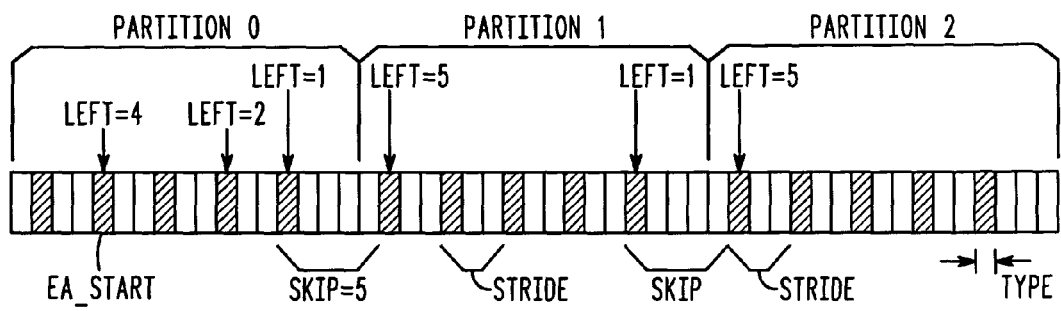
FIG. 4 is a representation of a partitioned memory in accordance with a further embodiment of the present invention.

A further example of a partitioned memory is shown in FIG. 4. Referring to FIG. 4, the same partitioned data structure is used, but in this example the starting address EA_START is part way through a partition, rather than at the start of a partition. The arithmetic unit is initialized with LEFT=4 and TOTAL=14. All of the other components of the partitioned memory remain as in the previous example. Since the data structure is preserved, this approach allows access to any vector element at anytime while still maintaining access to other elements.

A pseudo-code listing of an embodiment of the arithmetic unit (112 in FIG. 2) is given below.

```
// Initialization
EA = EA_START            //start address
LEFT = LEFT_START        //position in partition
COUNT = TOTAL            //element counter
// Loop over all data elements
WHILE COUNT > 0
    COUNT = COUNT - 1    //decrement element counter
    EA = EA + STRIDE * TYPE    // new address
    IF LEFT > 0          //in same partition
        LEFT = LEFT - 1
    ELSE                 //move to next partition
        EA = EA + SKIP * TYPE    //new address
        LEFT = SPAN      //reset partition position
END WHILE
```

If the STRIDE and SKIP values specify memory values, rather than a number of elements, the TYPE value is unity and may be omitted. In the embodiment described in the pseudo code above, the STRIDE value is applied after each element is addressed. In a further embodiment, the STRIDE value is not applied at the end of block, and the SKIP value modified accordingly. For example, for uniformly spaced elements, SKIP=0 for the first embodiment, while SKIP=STRIDE for the second embodiment. The second embodiment may be described by the pseudo code given below.

```
// Initialization
EA = EA_START            //start address
LEFT = LEFT_START        //position in partition
COUNT = TOTAL            //element counter
// Loop over all data elements
WHILE COUNT > 0
    COUNT = COUNT - 1    //decrement element counter
    IF LEFT > 0          //in same partition
        EA = EA + STRIDE * TYPE    // new address
        LEFT = LEFT - 1
    ELSE                 //move to next partition
        EA = EA + SKIP * TYPE    //new address
        LEFT = SPAN      //reset partition position
END WHILE
```

In the special case, where an equal number of elements are to be accessed from each partition, the LEFT value is initialized with SPAN value, where SPAN is the number of elements in a partition. Equivalently, the number of elements accessed in a partition may be counted and compared with the value SPAN, to determine if a skip should be made to the next partition.

In a further embodiment of the invention, the SKIP and STRIDE values denote the number of bits between elements, rather than the number of elements (words of length TYPE). In this embodiment, the TYPE parameter is not required.

Data from a three-dimensional structure (such as a video clip) is partitioned in two levels. The first level represents to rows of a particular image while the second level represents the image at a different time. A pseudo-code listing of a further embodiment of the arithmetic unit (112 in FIG. 2) for accessing three-dimensional data is given below.

```
// Initialization
EA = EA_START            //start address
LEFT = LEFT_START        //position in partition 1
LEFT2 = LEFT2_START      //position in partition 2
COUNT = TOTAL            //element counter
// Loop over all data elements
WHILE COUNT > 0
    COUNT = COUNT - 1    //decrement element counter
    EA = EA + STRIDE * TYPE    // new address
    IF LEFT > 0          //in same level 1 partition
        LEFT = LEFT - 1
    ELSE                 //move to next partition
        EA = EA + SKIP * TYPE    //new address
        LEFT = SPAN      //reset partition position
        IF LEFT2 > 0     //in same level 2 partition
            LEFT2 = LEFT2 - 1
        ELSE             //move to next partition
            EA = EA + SKIP2 * TYPE    //new addr.
            LEFT2 = SPAN2    //reset position
        ENDIF
    ENDIF
END WHILE
```

In this embodiment an additional counter LEFT2 and additional parameters SPAN2 and SKIP2 are required to allow for the extra dimensional. It will be clear to those of ordinary skill in the art how the technique may be expanded to access higher dimensioned data structures.

Figure 5:
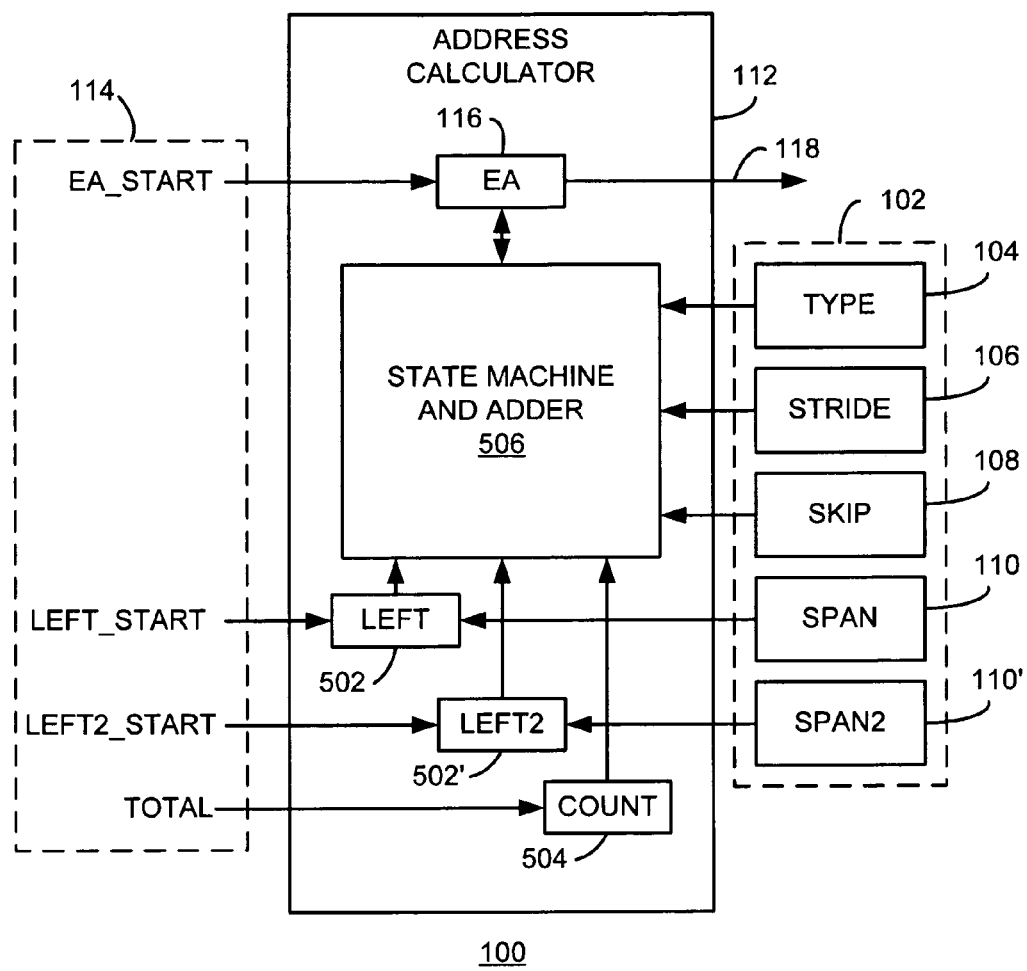
FIG. 5 is a representation of a further addressing system consistent with certain embodiments of the invention.

An exemplary embodiment of the address calculator 100 of present invention is shown in FIG. 5. Referring to FIG. 5, the address calculator 100 comprises a set of storage elements 102. In one embodiment the storage elements 102 include a TYPE register 104, a STRIDE register 106, a SKIP register 108 and SPAN registers 110 and 110'. The registers are accessed by an arithmetic unit 112. The arithmetic unit may, for example, comprise counters 502, 502' and 504 and a state machine and adder 506. The address pointer 116 (EA) is initialized to the start address denoted by EA_START. The first counter 502 indicates the number of data elements remaining in the first partition of a first memory level and is initialized to the value LEFT_START. The first counter 502' indicates the number of data elements remaining in the first partition of a second memory level and is initialized to the value LEFT2 _START. The third counter 504 indicates the total number of data elements to be accessed in the memory and is initialized to the value TOTAL. Once initialized, the arithmetic unit 112 is operable to calculate the address of a current data element in memory from the address of the previous element. The current address (EA) is stored in address pointer 116 and may be output at 118 to access the memory.

Those of ordinary skill in the art will recognize that the present invention has application in general purpose processors as well as microprocessor based computers, digital signal processors, microcontrollers, dedicated processors, and other hardware accelerators including vector processors.

The present invention, as described in embodiments herein, is implemented using hardware elements operating as broadly described in pseudo-code form above. However, those skilled in the art will appreciate that the processes described above can be implemented in any number of variations. For example, the order of certain operations carried out can often be varied, additional operations can be added or operations can be deleted without departing from the invention. Such variations are contemplated and considered equivalent. Further, the invention may be constructed using custom circuits, ASIC's and/or dedicated hard-wired logic or alternative equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A system for addressing a vector of elements in a memory having a plurality of partitions, the system comprising:
   a first storage element for storing a STRIDE value denoting the separation between elements of the vector of elements within each partition of the plurality of partitions;
   a second storage element for storing a SKIP value related to the separation between the last element of the vector of elements in one partition of the plurality of partitions and the first element of the vector of elements in the next partition of the plurality of partitions;
   a third storage element for storing a SPAN value denoting the number of elements the vector of elements within each partition of the plurality of partitions; and
   an arithmetic unit coupled to the first, second and third storage elements and operable to calculate the address in the memory of a next element of the vector of elements from the address of a current element, the calculation comprising adding a multiple of the SKIP value to the address of the current element if the next element is in a different partition to the current element and adding a multiple of the STRIDE value to the address of the current element if the next element is in the same partition as the current element.

2. A system in accordance with claim 1, wherein the STRIDE and SKIP values denote a number of elements and further comprising:
   a fourth storage element for storing a TYPE value denoting the size of each element of the vector of elements;
   wherein the arithmetic unit is coupled to the fourth storage element and is operable to calculate the address in the memory of a next element of the vector of elements dependent upon the values stored in the first, second, third and fourth storage elements and the address of a current element.

3. A system in accordance with claim 1, wherein operation of the arithmetic unit is dependent upon an initial element address EA_START that is indicative of the address of the first element in the vector of elements.

4. A system in accordance with claim 3, wherein operation of the arithmetic unit is further dependent upon the number of elements LEFT_START in the first partition of the plurality of partitions.

5. A system in accordance with claim 2, wherein the system is operable to address a specified number of elements.

6. A system in accordance with claim 2, wherein the arithmetic unit is operable to receive a control instruction indicative of the TYPE, STRIDE, SKIP and SPAN values.

7. A system in accordance with claim 1, wherein the arithmetic unit is operable to receive a control instruction indicative of the address of the first element EA_START, the number of elements LEFT_START in the first partition of the plurality of partitions and the total number of elements TOTAL to be addressed.

8. A system in accordance with claim 1, wherein the arithmetic unit includes:
   a first counter for counting a LEFT value indicative of the number of elements remaining in a current memory partition;
   a second counter for counting a COUNT value indicative of the total number of elements still to be accessed.

9. A system in accordance with claim 8, wherein the arithmetic unit is operable to reset the first counter when the end of a partition is reached.

10. A system for addressing a vector of elements in a memory having a plurality of partitions, the system comprising:
    a first storage element for storing a STRIDE value denoting the separation between elements of the vector of elements within each partition of the plurality of partitions;
    a second storage element for storing a SKIP value related to the separation between the last element of the vector of elements in one partition of the plurality of partitions and the first element of the vector of elements in the next partition of the plurality of partitions;
    a third storage element for storing a SPAN value denoting the number of elements the vector of elements within each partition of the plurality of partitions; and
    an arithmetic unit coupled to the first, second and third storage elements and operable to calculate the address in the memory of a next element of the vector of elements dependent upon the values stored in the first, second and third storage elements and the address of a current element,
    wherein the plurality of partitions includes first level partitions and second level partitions and the arithmetic unit includes:
    a fourth storage element for storing a SKIP2 value related to the separation between the last element of the vector of elements in a first level partition and the first element of the vector of elements in a second level partition;
    a fifth storage element for storing a SPAN2 value denoting the number of vectors in each second level partition;
    a first counter for counting a LEFT value indicative of the number of elements remaining in a current first level memory partition;
    a second counter for counting a LEFT2 value indicative of the number of elements remaining in a current second level memory partition; and
    a third counter for counting a COUNT value indicative of the total number of elements still to be accessed.

11. A processing system operable to access a partitioned memory, the processing system comprising:
    a processing unit having a plurality of functional elements;
    an external interface;
    an input unit coupled to the processing unit and the external interface and operable to retrieve a vector of elements from the memory via the external interface and pass them to the processing unit, the input unit having a set of input storage elements for storing STRIDE, SKIP and SPAN values and an input arithmetic unit operable to calculate the address in the memory of a next element of the vector of elements dependent upon the STRIDE, SKIP and SPAN values and the address of a current element;
    an output unit coupled to the processing unit and the external interface and operable to retrieve a result value from the processing unit and pass it to the external interface; and a program sequencer coupled to and operable to control the processing unit, the input unit and the output unit;

wherein the STRIDE value denotes the separation between elements of the vector of elements within each partition of the partitioned memory, the SPAN value denotes the number of elements the vector of elements within each partition of the plurality of partitions, and the SKIP value denotes the separation between the last element of the vector of elements in one partition of the partitioned memory and the first element of the vector of elements in the next partition of the partitioned memory and wherein the input arithmetic unit is operable to calculate the address the next element of the vector of elements from the address of a current element by adding a multiple of the SKIP value to the address of the current element if the next element is in a different partition to the current element and adding a multiple of the STRIDE value to the address of the current element if the next element is in the same partition as the current element.

12. A processing system in accordance with claim 11, wherein the input unit has an additional input storage element for storing a TYPE value and wherein the input arithmetic unit is operable to calculate the address in the memory of a next element of the vector of elements from the address of a current element by adding the product of the TYPE value with the SKIP value to the address of the current element if the next element is in a different partition to the current element and adding the product of the TYPE value with the STRIDE value to the address of the current element if the next element is in the same partition as the current element.

13. A processing system in accordance with claim 11, wherein the output unit is operable to store a vector of elements received from the processing unit to the memory via the external interface, the output unit having a set of output storage elements to store TYPE, STRIDE, SKIP and SPAN values and an output arithmetic unit operable to calculate the address in the memory of a next element of the vector of elements dependent upon the TYPE, STRIDE, SKIP and SPAN values and the address of a current element.

14. A processing system in accordance with claim 11, wherein the external interface is a memory interface and further comprising a memory unit coupled to the memory interface.

15. A method for accessing a vector of elements in a memory having a plurality of partitions, comprising:
   accessing the memory at an element address in a partition;
   stepping a first counter; and
   if a second counter indicates that at least one vector element remains in the partition:
      incrementing the element address by a first amount; and
      stepping the second counter;
   otherwise:
      incrementing the element address by a second amount; and
      resetting the second counter to indicate the number of elements of the vector of elements in a partition.

16. A method in accordance with claim 15, wherein the first amount is a product of the size of an element and the number of memory elements between adjacent vector elements in a partition.

17. A method in accordance with claim 15, wherein the first amount is a difference between consecutive vector element addresses in a partition.

18. A method in accordance with claim 15, wherein the second amount is a product of the size of an element and the number of elements between last element of one partition and the first element of the next partition.

19. A method in accordance with claim 15, wherein the second amount is a difference between the last vector element address in one partition and the first vector element address in the next partition.

20. A method in accordance with claim 15, wherein the element address is initialized as the address of the first element in a partition and wherein the first counter is initialized to indicate the number of elements of the vector of elements in the first partition of the plurality of partitions, thereby allowing memory access to begin part way through the first partition.

21. A method in accordance with claim 15, wherein accessing the memory at the element address in a partition comprises reading a value of appropriate size stored at the element address.

22. A method in accordance with claim 15, wherein accessing the memory at the element address in a partition comprises storing a value of appropriate size at the element address.

23. A method in accordance with claim 15, wherein the first counter, the second counter and the element address are not re-initialized if the memory access is interrupted and resumed before all of the elements of the vector have been accessed.

24. A method in accordance with claim 15, wherein the first amount and the second amount are set to default values unless otherwise specified.

25. A method for accessing a vector of elements in a memory having a plurality of first and second level partitions, comprising:
   accessing the memory at an element address in a first level and second level partition of the plurality of first and second level partitions;
   stepping a first counter;
   incrementing the element address by a first amount; and
   if a second counter indicates that at least one vector element remains in the first level partition:
      stepping the second counter;
   otherwise:
      incrementing the element address by a second amount;
      resetting the second counter to indicate the number of elements of the vector of elements in the next first level partition; and
      if a third counter indicates that at least one vector element remains in the second level partition:
         stepping the third counter;
      otherwise:
         incrementing the element address by a third amount;
         resetting the third counter to indicate the number of elements of the vector of elements in the next second level partition.

* * * * *